United States Patent Office 3,481,683
Patented Dec. 2, 1969

3,481,683
4-BENZOTHIAZOYL AND 4-BENZOTHIADIAZOYL AZO DYED POLYOLEFIN ARTICLES AND FIBERS AND THEIR DYEING
Shinya Ito, Kyoto, Katsuo Kanno, Ohtsu-shi, and Ryoichi Nakagawa, Fuse-shi, Osaka-fu, Japan, assignors to Daito Chemical Industry Co., Ltd., Osaka, Japan
No Drawing. Original application July 15, 1965, Ser. No. 472,339, now Patent No. 3,388,114, dated June 11, 1968. Divided and this application Aug. 30, 1967, Ser. No. 671,528
Claims priority, application Japan, July 20, 1964, 39/40,374, 39/40,375
Int. Cl. D06p 3/00
U.S. Cl. 8—4                  20 Claims

ABSTRACT OF THE DISCLOSURE

Polyolefin articles containing a metal compound are dyed with water-insoluble monoazo dyestuffs of the formula

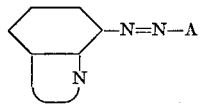

wherein

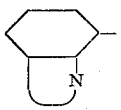

is a member selected from the group consisting of the residues of benzothiazole, 1,2,3-benzothiadiazole and 2,1,3-benzothiadiazole, said residues being substitutable with halogen, alkyl, alkoxy, acyl, alkylamino, dialkylamino, acylamino and mercapto; and A is a member selected from the class consisting of aromatic rings, heterocyclic, cycloaliphatic and aliphatic groups, a hydroxyl group being attached thereto at one of the ortho positions with respect to the position of attachment of said A to the —N=N— group and the other positions of said A being substitutable with hydrogen, halogen, hydroxy, alkoxy, alkylamino, dialkylamino, arylamino, phenyl, substituted phenyl, carboxylic esters, carboxylic amides and heterocyclic group.

---

This application is a division of copending application, Ser. No. 472,339, filed July 15, 1965, now Patent No. 3,388,114.

This invention relates to a method of using new water-insoluble monoazo dyestuffs to impart bright and fast colors to polyolefin articles containing a metal compound.

In general, the resins predominantly of polyolefins such as polypropylene and polyethylene do not essentially possess dyeability. Although numerous attempts have been made to improve their dyeability by introduction of sites receptive to dyes, the colorfastness to the various agents which cause fading was not satisfactory and hence it was not possible to obtain dyed articles thereof which were serviceable. Lately, much research is being conducted into a method of dyeing wherein the polyolefin is incorporated with a metal compound and then it is dyed with a dyestuff containing a slightly ionizable acid group or a similar group. Dyestuffs which are used for such metal-containing polyolefins are disclosed in the American Dyestuff Reporter (1963), pages 31 and 527, Japanese patent application publication No. 4477/1963, and Belgian patents specification Nos. 632,652 and 632,653. As dyestuffs which form coordinate bonds with metals, the water-soluble dyes having a salicylic acid residue and o-hydroxyazo residue in the direct dyes and acid dyes have already been known for a long time. Further, recently there is available the 1:2 type complex azo dyestuff, the so-called formazan type dyestuff, not containing a water-soluble group, which are for wool and polyamide use. However, even though attempts have been made to impart coloring directly to the foregoing metal-containing polyolefin shaped articles with the non-metallized dye nucleus of these dyestuffs, a serviceable coloring cannot be imparted at all. On the other hand, the compounds mentioned in the foregoing American Dyestuff Reporter, such as alizarin-1,8-dihydroxyanthraquinone, 1,8-dihydroxynaphthalene and o-carboxyl-o'-hydroxyazobenzene, which are believed to be metallizable, in all cases are weak as to their ability to bond with metals. Hence, although some may be able to impart a pale coloring, they are still unsatisfactory with respect to their fastness.

Again, although dyed articles having a deepness of shade and fastness to a certain extent can be obtained in the case of some of the compounds disclosed in Japanese patent application publication No. 4477/1963, for example, the derivatives of 5-arylazo-8-hydroxyquinoline, 7-hydroxy-4-arylazo indazole, 7-arylazo-4-hydroxybenzothiazole, by limiting the substituent to the aryl group, the classes of hues obtainable are limited to within a narrow range. Again, among the o,o'-dihydroxyazo derivatives disclosed in Belgian patent specification No. 632,652, those whose structure is limited can achieve in part the imparting of coloring as intended. The dyeing power is low however and the matter of selectivity is involved depending upon the class of metal.

On the other hand, the azo dyestuff derivatives containing thiazole or oxazole, as disclosed in Belgian patent specification No. 632,653 are believed to be the best dyestuffs that are of practical use at the present time in that they possess fastness properties to the various agents which cause fading and in that deep shades are obtainable. However, the dyestuff of this structure also is deficient as far as level dyeing is concerned on account of the fact that its speed of adherence is fast. In addition, bright colors cannot be obtained because of the dullness of its hues.

Hence, as hereinabove indicated, numerous problems needing further research still remain in the case of the conventional metal-containing dyestuffs for polyolefin use, including not only such matters as dyeing power and fastness to the various agents which cause fading but also such matters as level dyeing, hue and brightness of color. Although there are many elements and groups that are generally known to be capable of forming a coordinate bond and some proposals have been made as to compounds that are metallizable, it is a difficult feat to solve this matter merely by analogical inference from general theories. Great inventive ability is required to solve these problems and find a dyestuff of value.

An object of the present invention is to provide a method of dyeing the dyestuffs. A further object is to provide a method of dyeing the metal compound-containing polyolefinic shaped articles to a bright color tone, as contrasted with the dull color tone characteristic of the conventional metal complex dyestuffs, and in which the coloring imparted possesses superior fastness to light, dry cleaning, washing, rubbing and sublimation. Other objects and advantages of the present invention will be apparent from the following description.

The dyestuffs employed according to the invention are water-insoluble monoazo dyes having the formula

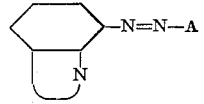

wherein

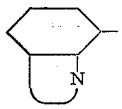

is a member selected from the group consisting of the residues of benzothiazole, 1,2,3-benzothiadiazole and 2,1,3-benzothiadiazole, said residues being substitutable with halogen, alkyl, alkoxy, acyl, alkylamino, dialkylamino, acylamino and mercapto; and A is a member selected from the class consisting of aromatic rings, heterocyclic, cycloaliphatic and aliphatic groups, a hydroxyl group being attached thereto at one of the ortho positions with respect to the position of attachment of said A to the —N=N— group and the other positions of said A being substitutable with hydrogen, halogen, hydroxy, alkoxy, alkylamino, dialkylamino, arylamino, phenyl, substituted phenyl, carboxylic esters, carboxylic amides and heterocyclic group.

As can be seen in the foregoing formula, the dyestuff employed in the present invention is composed of a coupling component A and a diazo component having the structure wherein a benzene ring and a hetero ring containing at least one tertiary nitrogen atom have been condensed. Further, said tertiary nitrogen atom is directly attached to the benzene ring to a carbon atom at the ortho position with respect to the carbon atom which bonds with the diazo group, —N=N—. While the diazo component can have a non-solubilizing substituent, as hereinbefore indicated, it does not contain a soluble group such as a carboxylic acid group or a sulfonic acid group.

The coupling component is either an aromatic, heterocyclic, aliphatic or cycloaliphatic compound which has a hydroxyl group which can assume the ortho position with respect to the azo group. The positions other than at which said hydroxyl group is attached can be substituted with the various substituents that have been hereinbefore mentioned.

As the coupling component there are included, e.g., β-naphthol, p-cresol, p-chlorophenol, p-bromophenol, 3,4-dimethylphenol, 3-dimethylamino-phenol, 3-diethylamino-phenol, hydroquinone monomethyl ether, 6-chloro-2-naphthol, 2-hydroxy-3-naphthoic acid ethyl ester, 6-methyl-2-naphthol, 4-methoxy-1-naphthol, 4-chloro-1-naphthol, 4-methyl-1-naphthol, 1-phenyl-3-methyl-5-pyrazolone, 1-(o-chlorophenyl) - 3 - methyl - 5 - pyrazolone, 1-(o-methylphenyl) - 3 - methyl - 5 - pyrazolone, 3 - methyl - 5 - pyrazolone, 3-hydroxy-5-methylthionaphthene, resorcinol, acetoacetic ethyl ester, acetoacetic anilide, acetoacetic ethyl amide, dimedone and acetylacetone; and derivatives thereof.

The invention monoazo dyestuffs can be prepared by diazotizing the foregoing amines in customary manner and thereafter coupling the diazotized amines with the foregoing coupling components under either alkaline or acid conditions.

The method of dyeing shaped articles of polyolefin polymers according to the present invention comprises dyeing a shaped article of polyolefin polymer obtained by melt shaping polyolefin resins wherein is incorporated at least 0.01% by weight, based on the resin, of a transition metal compound, calculated as the metal, with a water-insoluble monoazo dyestuff of the formula

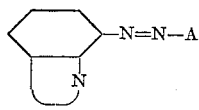

wherein

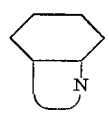

and A have the precedingly recited significances.

The polyolefin resins which are used in this invention include the homopolymers of α-olefins, such as ethylene, propylene, 3-methylbutene-1, 4-methylpentene-1 and 5-methylhexene-1. Also included are the copolymers of two or more of these α-olefins as well as the graft polymers consisting of these parent polymers to which other monomers have been grafted. Other polymers, for example, polyesters, polyamides, polyureas, polyurethanes, epoxy resins or polycarbonates may be mixed with the foregoing olefin polymers. Further, they may also contain antioxidants of the phenol or amine type, ultraviolet absorbers or optical brightening agents such as benzophenone or triazine derivatives, delustrants such as titanium dioxide, stabilizers or dyeing power promoters such as the alkaline earth metal salts of aliphatic acids or organic phosphates, or plasticizers such as dioctyl phthalate.

The metal compounds to be incorporated in the poly olefin polymers in accordance with the invention dyeing method are the dissociable compounds of transition metals. The preferred transition metals include nickel, zinc, copper, chromium and cobalt, of which nickel is to be particularly preferred. As the dissociable compounds of the transition metals, the use of the organic acid salts and the organic complexes is preferred. Particularly preferred are the higher carboxylic acid salts such as nickel stearate, nickel palmitate, nickel oleate, nickel naphthenate, chromium stearate, cobalt stearate and copper naphthenate. Conjointly with these higher carboxylic acids or in their stead can also be used the salts of amino acids such as the nickel salt of α-amino acid, alkyl phosphates such as di-n-propyl nickel phosphate and n-hexyl ethyl nickel phosphate, sulfonates such as dodecyl benzene nickel sulfonate and t-octyl benzene chromium sulfonate, as well as the benzoates, salicylates, alkyl phosphites, naphthionates and alkyl sulfates. In addition, the organic complexes such as nickel acetylacetonate and zinc-8-hydroxyquinolinate, and the weak chelate compounds such as the metal chelate compounds of the acetoacetic acid derivatives and malonic ester derivatives are also usable. The dyeing speed is relatively slow in the case of the metal chelate compounds however, since the substitution of chelate takes place between the chelate compounds and the dyestuff.

The polyolefin resin, before its melt-shaping, is incorporated with at least 0.01% by weight, and preferably 0.1–1% by weight, based on the resin, of a transition metal compound, calculated as the metal.

Although the metal compounds of copper, silver and gold, which are incorporated in the polyolefin compounds according to the present invention, form a satisfactory coordinate bond with the dyestuffs of the invention, they have the drawback that they readily change to brown in the polyolefin resin when the melting temperature is high. On the other hand, when the metal compounds of zinc, cadmium, mercury, titanium, zirconium and hafnium are used, little, if any, discoloration takes place during melt-shaping of the polyolefin resins, though slight decomposition of the metal compounds is noted. Their property of forming coordinate bonds with the invention dyestuff is slightly inferior, however. In the case of the metal compounds of chromium, molybdenum and tungsten, they are stable in the molten polymer and no thermal discoloration takes place. Although their dyeing effectives resulting from their coordinate bond with the invention dyestuff is somewhat inferior, their colorfastness to the various agents which cause fading is satisfactory. The metal compounds of iron, cobalt and nickel are satisfactory with respect to their thermal stability in the molten polymer as well as in their property of forming a coordinate bond with the dyestuffs of this invention and in their fastness properties. The use of a cobalt compound involves some deterioration of the weatherability of the polymer, however.

When the hues and brightness that are obtainable by means of the dyestuffs as used in this invention and the fastness properties of the resulting dyed product are considered, nickel, zinc, copper and chromium are desirable as the metal component, nickel and zinc being particularly preferred.

In dyeing in accordance with the present invention the foregoing metal compound-containing polyolefin shaped articles, these various new monoazo dyes, as hereinbefore described, are kneaded together with an anionic or nonionic dispersant and/or a solubilizing agent and rendered into finely divided particles. Or, if necessary, an inorganic salt such as sodium chloride is added nad the mixture is made into an aqueous paste or is, after drying, ground into a finely divided powder by means of an ultra high speed pulverizer. As the dispersant or solubilizing agent, there are used the anionic or nonionic activators, which are optionally chosen. However, when this dyestuff is used dissolved in a polyoxyethylene nonionic surfactant wherein the polyoxyethylene content is 60–85%, instead of the ordinary anionic levelling agent, this dyestuff permeates to the interior of the polyolefin shaped article homogeneously and thoroughly. Hence, it is particularly desirable to prepare the dyeing liquid using this type of dyestuff treating agent. A particularly good dyeing liquid can be obtained by melt blending this type of dyestuff treating agent with the dye and thereafter diluting with water.

In this invention, optionally chosen dyeing methods, such as the carrier method, the solubilization method, the high temperature-high pressure method and the thermosol method, can be employed in carrying out the dyeing by using the aforementioned specific dyestuffs. The amount used of the dyestuff can be varied over a broad range, but an amount about 0.1–6.0%, based on the article to be dyed, is suitable. The dyeing temperature should preferably range between 70° and 120° C., there being a tendency to a decrease in the rate of adsorption at temperatures higher than this.

While excellent dyeing effects are had when the dyeing liquid is adjusted to a pH 3–8 in the invention dyeing method, a dyeing liquid which is strongly acid or above a pH 9 results in a slight decrease in the color values obtained.

The dyed article, after washing with water, is treated with a wash liquid in which is incorporated soap or an equally effective surfactant, followed by water washing and drying. Alternatively, reduction washing may be carried out using hydrosulfite, caustic soda and a suitable surfactant.

According to the present invention, dyed articles of remarkable brightness can be obtained, which are free of the dullness which was characteristic of the articles dyed with the conventional metal complex dyestuffs. It is also possible to obtain dyed products which excel in fastness to sunlight, washing, dry cleaning, rubbing and sublimation.

The dyestuffs according to the invention also exhibit an ideal dyeing speed curve, and remarkably satisfactory levelness of dyeing can be obtained. In addition, as these dyestuffs render the molecular volume great in the polyolefin shaped articles by the formation of metal complexes therein, their solubility in water or solids is greatly reduced, with the consequence that there is the effect that the transfer, detachment, extraction of sublimation of the dyestuff from the polymer substrate is completely prevented.

The following examples are given for illustrating the present invention. The evaluation of the fastness properties were in accordance with the following AATCC methods.

Fastness to light _____ (AATCC 16A–1963).
Fastness to washing _____ (AATCC 36 1961–III).
Fastness to rubbing _____ (AATCC 8–1961).
Fastness to dry cleaning ___ (AATCC 85–1963).
Fastness to sublimation _____ (AATCC 5–1957).

EXAMPLE 1

A solution of 19.4 g. of 2-methyl-4-amino-6-methoxybenzothiazole in 41.6 g. of 35% hydrochloric acid and 250 g. of water was cooled with ice to 0–5° C. and gradually dropped into a solution of 7.2 g. of sodium nitrite in 21.6 cc. of water, after which the solution was stirred at this temperature for 30 minutes. Then after adding 0.5 g. of decolorizing carbon, the solution was filtered.

The so prepared diazotized solution was dropped at 10–15° C. into a coupling component solution prepared by dissolving 15.1 g. of beta-naphthol in a solution consisting of 58.7 g. of 30% caustic soda in 200 cc. of water. After stirring this solution for 30 minutes at the foregoing temperature, the deposited coloring matter was filtered, followed by again suspending this coloring matter in 300 cc. of water. Then after acidifying the suspension to Congo red with dilute hydrochloric acid, it was adjusted to pH 7.5–8 with 10% ammonia water and again filtered, after which the crystals obtained were washed with water and dried at 60° C. 30.7 g. of reddish brown crystals were obtained in this manner. These crystals were recrystallized from dioxane and reddish brown crystals of 4-(2'-hydroxy-naphthyl-1-azo) - 6 - methoxy - 2 - methylbenzothiazole having a melting point of 195–198° C. were obtained. N analysis values: calculated 12.03%, found 12.00%.

Thirty grams of the foregoing dyestuff were thoroughly kneaded together with 45 g. of a condensation product formed from 2 mols of beta-naphthalene sulfonic acid and 1 mol of formaldehyde, 5 g. of a condensation product formed from 1 mol of nonylphenol and 10 mols of ethylene oxide neutralized with monosulfonic acid ethanolamine and 20 g. of p-toluene sodium sulfonate, in a three-roll mill using 20 g. of water. The resulting paste, after being dried at 60° C., was ground in an ultrahigh speed pulverizer to a finely divided dyestuff composition. When 0.5 g. (dyestuff content 30%) of the so obtained dyestuff composition was added to 300 cc. 40° C. water, a homogeneous dispersion was obtained. When 10 g. of filaments obtained by melt-spinning and drawing to 5 times at 240° C. in customary manner blended chips obtained by melt blending 95 parts of isotactic polypropylene powder having an inherent viscosity of 1.53 (measured in tetralin at 135° C.) and 5 parts of nickel stearate were dipped in this dispersion, the temperature being raised to 98° C. in 20 minutes and the treatment being carried out for one hour, followed by the customary soaping treatment, a product dyed a bright bluish red (lightness 17.4%, purity 81.0%, dominant wave-length 499.2 mμ) was obtained which possessed color fastness to sunlight, washing, rubbing, sublimation and dry cleaning as indicated below.

| | Grade |
|---|---|
| Fastness to light | 7 |
| Fastness to washing | 5 |
| Fastness to rubbing | 5 |
| Fastness to sublimation | 5 |
| Fastness to dry cleaning | 5 |

EXAMPLE 2

19.4 grams of 2-methyl-4-amino-6-methoxybenzothiazole were diazotized as in Example 1. When this diazotized product was treated as in Example 1 using 16.6 g. of 4-methoxy-1-naphthol as the coupling component, 32.1 g. of dark purple crystals were obtained. Then when these crystals were recrystallized from dioxane, dark purple crystals of 4-(1'-hydroxy-4'-methoxynaphthyl-2'-azo) - 2 methyl-6-methoxybenzothiazole having a melting point of 185–188° C. were obtained. N analysis values: calculated 11.75%, found 11.73%. 0.2 g. of the so obtained dyestuff and 0.2 g. of a nonionic surfactant obtained from nonylphenol and 20 mols of ethylene oxide were thoroughly kneaded, after which the kneaded product was suspended in 250 cc. of water to prepare a dye bath. 10 g. of filaments obtained by spinning and drawing to 5 times blended chips containing 97 parts of isotactic polypropylene having an inherent viscosity of 1.60 (measured in tetralin at 135° C.), 3 parts of nickel stearate and 2 parts of zinc stearate were dipped in this dye bath and treated for 1 hour at 98° C. After washing with water, soaping treatment in customary manner was given the dyed filaments. As a result, a product dyed a deep blue (lightness 7.0%, purity 73.0%, dominant wave-length 469.0 m$\mu$) was obtained which possessed fastness to sunlight, washing, rubbing, sublimation and dry cleaning as indicated below.

|  | Grade |
|---|---|
| Fastness to light | 7 |
| Fastness to washing | 5 |
| Fastness to rubbing | 5 |
| Fastness to sublimation | 5 |
| Fastness to dry cleaning | 5 |

EXAMPLE 3

When 19.4 g. of 2-methyl-6-methoxy-4-aminobenzothiazole were diazotized as in Example 1, followed by carrying out the same treatment as in said example using 18.3 g. of 1-phenyl-3-methyl-5-pyrazolone as the coupling component, 35.8 g. of yellow crystals of 4-(1'-phenyl - 3' - methyl - 5' - pyrazolone - 4' - azo) - 2 methyl - 6-methoxybenzothiazole (dyestuff A) were obtained. Melting point 226–228° C. N analysis values: calculated 18.46%, found 18.41%. On the other hand, by using 3-methyl-5-pyrazolone instead of the 1-phenyl-3-methyl-5-pyrazolone and carrying out the same treatment, 35.8 g. of yellow crystals of 4-(3'-methyl-5'-pyrazolone-4'-azo)-2 methyl-6-methoxybenzothiazole (dyestuff B) were obtained. Melting point 174–177° C. N analysis values: calculated 23.09%, found 23.05%. When these dyestuffs were used and polypropylene fibers containing 5% of zinc stearate were treated as in Example 1, these fibers were dyed a brilliant yellow having fastness to sunlight, washing, rubbing, sublimation and dry cleaning as tabulated below.

| Dyestuff | Lightness, percent | Purity, percent | Dominant wavelength, m$\mu$ | Fastness grade | | | | |
|---|---|---|---|---|---|---|---|---|
| | | | | Light | Washing | Rubbing | Sublimation | Dry cleaning |
| A | 66.7 | 82.0 | 578.2 | 7 | 5 | 5 | 5 | 5 |
| B | 65.3 | 83.8 | 578.2 | 7 | 5 | 5 | 5 | 4 |

EXAMPLE 4

When 19.4 g. of 2-methyl-6-methoxy-4-aminobenzothiazole were diazotized as in Example 1 and then treated as in said example using 17.2 g. of 5-methyl-3-hydroxythionaphthene as the coupling component, 30.8 g. of reddish brown crystals of 4-(5'-methyl-3'-hydroxythionaphthyl - 4' - azo) - 2 - methyl - 6 - methoxybenzothiazole were obtained. Melting point 167–170° C. N analysis values: calculated 12.45%, found 12.40%.

By using the so obtained dyestuff and carrying out the treatment described in Example 1, polypropylene fibers containing 5% of zinc stearate were dyed a blueish red having fastness to sunlight, washing, rubbing, sublimation and dry cleaning. (Lightness 5.9%, purity 63.0%, dominant wave-length 528.5 m$\mu$.)

|  | Grade |
|---|---|
| Fastness to light | 5–6 |
| Fastness to washing | 5 |
| Fastness to rubbing | 5 |
| Fastness to sublimation | 5 |
| Fastness to dry cleaning | 5 |

EXAMPLE 5

A solution of 19.4 g. of 2-methyl-6-methoxy-4-aminobenzothiazole diazotized as in Example 1 was added at 10–15° C. to a coupling component solution consisting of 17.3 g. of m-diethyl-aminophenol in 57.9 g. of glacial acetic acid. After adjusting this mixture to a pH 4–4.5 by adding sodium acetate, it was stirred for 5 hours. The crystals deposited, after being filtered, were again suspended in 200 cc. of water and the suspension was acidified to Congo red. Then after adjusting the pH of the suspension to 7.5–8 with 10% ammonia water, filtration is again carried out, followed by washing the crystals with water and drying at 60° C. There were obtained 29.3 g. of reddish brown crystals of 4-(1'-hydroxy-5'-N,N-diethylamino - phenyl - 2' - azo) - 2 - methyl - 6 - methoxybenzothiazole. Melting point 113–115° C. N analysis values: calculated 15.12%, found 15.08%. By using the so obtained dyestuff and carrying out the treatment as in Example 1, polypropylene fibers containing 5% nickel stearate were dyed red having fastness to sunlight of Grade 4–5, to dry cleaning of Grade 4, to laundering of Grade 5, to rubbing of Grade 5 and to sublimation of Grade 5. (Lightness 20.3%, purity 62.1%, dominant wave-length 600.5 m$\mu$.) In a like manner, polypropylene fibers containing 5% of zinc stearate were dyed a fast yellowish red.

EXAMPLE 6

19.4 grams of 2-methyl-6-methoxy-4-amino-benzothiazol was diazotized in the same manner as in Example 1 and coupled with each of the coupling components indicated in the following Table I such as alkylphenols and alkoxyphenols in the same manner as in Example 1 to give a corresponding monoazo dyestuff. The melting point, N analysis values, color values and fastness properties are shown in Table I. The color shades obtained by coloring polypropylene fiber with the use of these dyestuffs are also shown in the same table.

TABLE I

| Coupling component (Material used) | Corresponding Monoazo Dyestuffs | | | Result of Dyeing—Shade of polypropylene fiber containing 5% of— | | Color value | | | Fastness to— | | | | |
|---|---|---|---|---|---|---|---|---|---|---|---|---|---|
| | Melting point (° C.) | Calculated | Found | Nickel stearate | Zinc stearate | Lightness | Purity | Dominant wavelength | Light | Washing | Rubbing | Sublimation | Dry cleaning |
| p-Methylphenol | 179–181 | 13.40 | 13.38 | Purple | Purple | 5.6 | 52.9 | −554.5 | 4–5 | 5 | 5 | 5 | 5 |
| 2,4-dimethylphenol | 158–160 | 12.83 | 12.79 | Deep blue | Deep blue | 6.1 | 45.8 | 565.0 | 4–5 | 5 | 5 | 5 | 5 |
| 3,4-dimethylphenol | 167–168 | 12.83 | 12.81 | Blueish red | Blueish red | | | | 4–5 | 5 | 5 | 5 | 5 |
| p-Tert-butylphenol | 132–133 | 12.82 | 11.80 | Red purple | Red purple | 8.0 | 55.4 | −553.7 | 5–6 | 5 | 5 | 5 | 4 |
| 2-tert-butyl-4-methylphenol | 189–191 | 11.37 | 11.32 | Reddish blue. | Blueish red | | | | 5 | 5 | 5 | 5 | 4 |
| p-Methoxyphenol | 133–136 | 12.76 | 12.70 | Blue | Blue | 13.8 | 59.5 | 477.2 | 5–6 | 5 | 5 | 5 | 5 |
| p-Ethoxyphenol | 112–115 | 12.24 | 12.19 | Lime violet | do | | | | 5–6 | 5 | 5 | 5 | 5 |
| p-Benzyloxyphenol | 194–196 | 10.36 | 10.32 | Blue | do | | | | 5 | 5 | 5 | 5 | 4 |
| 2-methyl-4-allylphenol | 158–159 | 11.37 | 11.34 | Slightly blueish grey. | do | | | | 5 | 5 | 5 | 5 | 5 |
| m-Hydroxydiphenylamine | 95–97 | 14.35 | 14.29 | Red | Orange red | 18.0 | 43.0 | 616.0 | 5 | 5 | 5 | 5 | 5 |

EXAMPLE 7

Using various diazo components and coupling components, corresponding azodyestuffs of the present invention were obtained. A polypropylene fiber containing 5% of either nickel stearate or zinc stearate was colored with the use of the so obtained azo dyestuffs. The color shades are shown in Table II.

having an intrinsic viscosity of 1.53 (measured in tetralin of 135° C.) and 5 parts of nickel stearate at 240° C. in accordance with customary manner and then drawing the spun filament to 5 times the original length was immersed in said dispersion and heated to 98° C. After one hour's treatment, the filament was treated with soap. There was obtained lustrous, slightly greenish blue dyeing having

TABLE II

| Dyestuff | Shade of polypropylene fiber containing— | |
| --- | --- | --- |
| | Nickel stearate | Zinc stearate |
| 2-methyl-6-methoxy-4(2'-hydroxy-5'-chlorophenylazo)-benzothiazole | Red purple | Red purple. |
| 2-methyl-6-methoxy-4(2'-hydroxy-5'-carboxyamyl-phenyl)-benzothiazole | do | Do. |
| 4(2'-hydroxy-3'-carboxybutyl-naphthylazo)-6-methyl-benzothiazole | Blueish red | Do. |
| 2-methyl-4-(α-acetylacetic anilid-(α)-ylazo)benzothiazole | Yellow | Yellow. |
| 2-methyl-4-(α-acetylacetic ethyl-(α)-azo)benzothiazole | do | Do. |
| 2-methyl-6-methoxy-4-(2'.6'-duhydroxy-4'-dimethyl-dichlorohexylazo)-benzothiazole | Golden color | Yellow |
| 2-methyl-6-methoxy-4-(α-acetylaceton-(α)-ylazo)-benzothiazole | Yellow | Greenish yellow. |
| 2-methyl-6-methoxy-4-(1'.3'-indandion-2'-ylazo)-benzothiazole | Red orange | Red orange. |
| 2-methyl-6-methoxy-4-(2'-hydroxy-5',6',7',8'-tetrahydronaphthylazo)-benzothiazole | Red purple | Red purple. |
| 2,5,7-trimethyl-4-(2'-hydroxy naphthlyazo)-benzothiazole | Blue red | Blue red. |
| 2-acetylamino-6-ethoxy-4-(2'-hydroxy-3',5'-dimethylphenylazo)-benzothiazole | Reddish-blue | Reddosh blue. |
| 2-acetylamino-4-(2'-hydroxy-4'-diethylaminophenyl)-6-methyl-benzothiazole | Red | Red. |
| 4-(1'-phenyl-3'-methyl-5'-pyrazolon-4'-ylazo)-6-methylbenzothiazole | Yellow | Yellow. |
| 4-(2'-hydroxy-5'-methyl-phenylazo)-6-methylbenzothiazole | Purple | Purple. |
| 2-methyl-4-(4'-ethoxy-1-naphthol-2-ylazo)-6-chlorobenzothiazole | Blue | Blue. |
| 2-methyl-4-(2'-hydroxy-4'-dimethylaminophenylazo)-6-chlorobenzothizaole | Orange red | Orange red. |
| 2-dimethylamino-4-(2'-hydroxynaphthylazo)-benzothiazole | Red purple | Red purple. |
| 2-dimethylamino-4-(3'-methyl-5'-pyrazolon-4'-ylazo)-benzothiazole | Yellow-orange | Yellow orange. |
| 2-dimethylamino-4-(5'-hydroxyacenaphthen-4'-ylazo-)benzothiazole | Reddish blue | Reddish blue. |
| 2-mercapto-4-(2'-hydroxynaphthlyazo)-6-methylbenzothiazole | Blue red | Blue red. |
| 2-mercapto-4-(2'-hydroxy-5'-tertbutyl)-6-methylbenzothiazole | Red purple | Red purple. |
| 2-methyl-4-(2'-hydroxy-3',5'-dimethyoxyphenylazo)-6-methoxy-benzothiazole | Blue | Blue. |

EXAMPLE 8

8 grams of 4-amino-6-methoxy-1,2,3-benzothiazole were dissolved in 24 g. of a 98% sulphuric acid and a solution of 3.7 g. of sodium nitrite dissolved in 37 g. of a 98% sulphuric acid at 70° C. was dropped thereinto at 8 to 10° C. After stirring for one hour at a temperature below 10° C., the obtained solution was gradually dropped at 10 to 15° C. into a coupling component solution prepared by dissolving 5 g. of p-cresol into a solution of 165 g. of 30% caustic soda in 400 cc. of water. After stirring at this temperature for 30 minutes, the precipitated crystals were filtered and again suspended in 200 cc. of water. The suspension was acidified to Congo red with a diluted hydrochloric acid and the pH thereof was adjusted to 7.5 to 8.0 with 10% aqueous ammonia. The suspension was then filtered, washed and dried at 60° C. There were obtained 122 g. of brown crystals having a melting point of 184 to 187° C. Further, brown crystals of 4-(1'-hydroxy-4'-methyl-benzene-2'-azo) - 6 - methoxy-1,2,3-benzothiadiazole having a melting point of 188 to 190° C. were obtained by re-crystallization from dimethylformamide. N analysis values: calculated 18.66%, found 18.65%.

30 grams of the obtained dyestuff were kneaded well with 45 g. of a condensation product prepared from 2 moles of β-naphthalenesulphonic acid and 1 mole of formaldehyde, 5 g. of a salt of a condensation product formed from 1 mole of nonylphenol and 10 moles of ethylene oxide neutralized with monosulphonic acid ethanolamine, 20 g. of p-toluene sodium sulphonate and 20 g. of water by means of three rolls. The paste so obtained was dried at 60° C. and pulverised on a super high speed pulveriser to thereby form a dyestuff composition in the form of fine particles.

0.5 gram of the so prepared dyestuff composition (30% of pure dyestuff content) was added to 300 cc. of water at 40° C. to form a homogeneous dispersion. 10 grams of a filament which was prepared by melt spinning a chip mixture of 95 parts of powdery isotactic polypropylene excellent fastness to sunlight (Grade 5–6), drycleaning (Grade 5), washing (Grade 5), rubbing (Grade 5) and sublimation (Grade 5). It had a lightness of 8.8% purity of 44.0% and a dominant wavelength of 484.7 mμ.

EXAMPLE 9

8 grams of 4-amino-6-methoxy-1,2,3-benzothiazole were diazotized in the same manner as in Example 8, and gradually dropped at 10 to 15° C. into a coupling component solution prepared by dissolving 4.5 g. of 3-methyl-5-pyrazolone into a solution consisting of 165 g. of 30% caustic soda and 400 cc. of water. After stirring for 30 minutes at this temperature, the precipitated crystals were filtered and again suspended in 200 cc. of water. After the same treatment as in Example 8, there were obtained 11.8 g. of yellow brown crystals having a melting point of 182 to 186° C. Brown crystals of 4-(3'-methyl-5'-pyrazolone-4'-ylazo) - 6 - methoxy-1,2,3-benzothiazole having a melting point of 193 to 195° C. were obtained by re-crystallization from dimethylforamide. N analysis values: calculated 28.95%, found 28.91%.

The so prepared dyestuff colours a polypropylene fiber containing 5% of nickel stearate in yellow orange colour. The dyeing had an excellent fastness to sunlight (Grade 5–6), washing (Grade 5), rubbing (Grade 5), sublimation (Grade 5) and drycleaning (Grade 5) and also a lightness of 40.0%, a purity of 87.5% and a dominant wavelength of 588.0 mμ.

EXAMPLE 10

8 grams of 4-amino-6-methoxy-1,2,3-benzothiazole were diazotized in the same manner as in Example 8. The diazotized product was coupled with each of the coupling components listed in Table III such as alkylphenols, alkoxynaphthols and alkoxyphenols in the same manner as in Example 8 to form a corresponding monoazo dyestuff.

The melting point of said dyestuff and the results of the coloring of a polypropylene fiber by means of each of these dyestuffs are shown in the table.

TABLE III

| Used Material | Melting point of dyestuff (° C.) | Shade of polypropylene fiber containing 5% of— | | Color values | | | Fastness to— | | | | |
|---|---|---|---|---|---|---|---|---|---|---|---|
| | | Nickel stearate | Zinc stearate | Lightness, percent | Purity, percent | Dominant wavelength (Mµ) | Light | Washing | Rubbing | Sublimation | Drycleaning |
| N,N-diethyl-m-aminophenol | 263–264 | Purple | Reddish purple | 9.6 | 48.0 | −567.0 | 4–5 | 5 | 5 | 5 | 5 |
| 4-methoxy-1-naphthol | 224–228 | Blueish green | Blueish green | 23.6 | 42.0 | −485.7 | 4–5 | 5 | 5 | 5 | 5 |
| 4-allyl-2-methoxyphenol | 185.5–187 | Green | Green | 11.5 | 21.0 | 499.8 | 4–5 | 5 | 4 | 4 | 5 |
| p-Chlorophenol | 190–191.5 | Brilliant blue | Bright blue | 4.6 | 19.8 | 423.5 | 4–5 | 5 | 4 | 4 | 4 |
| p-Tert-butylphenol | 163–165 | Blue | do | 4.3 | 20.1 | 471.6 | 5–6 | 5 | 5 | 5 | 5 |
| 2,4-dimethylphenol | 162–165 | Green | Green | 9.6 | 20.5 | 499.8 | 5–6 | 5 | 5 | 5 | 5 |
| p-Methoxyphenol | 177–179 | Blueish green | do | 13.7 | 20.5 | 499.5 | 5–6 | 5 | 5 | 5 | 5 |

EXAMPLE 11

Each of the monoazo dyestuffs indicated in Table IV was prepared by coupling 4-amino-1,2,3-benzothiadiazole derivative with a coupling component. Using this dyestuff a polypropylene fiber containing 5% of either nickel stearate (A) or zinc stearate (B) was colored. The shades are also shown in the table.

TABLE IV

| Dyestuff | Shade of (A) Fiber | Shade of (B) Fiber |
|---|---|---|
| 6-methoxy-4-(2'-hydroxy-4'-dimethylaminophenyl-1'-azo)-benzothiadiazole-1,2,3 | Purple | Purple. |
| 6-methoxy-4-(2'-hydroxy-3',5'-dimethylphenyl-1'-azo)-benzothiadiazole-1,3,3 | Green | Green. |
| 6-methoxy-4-(2'-hydroxy-5'-chlorophenyl-1'-azo)-benzothiadiazole-1,2,3 | Blue | Blue. |
| 6-methoxy-4-(2'-hydroxy-5'-tert-butylphenyl-1'-azo)-benzothiadiazole-1,2,3 | do | Do. |
| 6-methoxy-4-(2'-hydroxy-3'-tert-butyl-5'-methylphenyl-1'-azo)-benzothiadiazole-1,2,3 | Green | Green. |
| 6-methoxy-4-(2'-hydoxy-5'-methoxyphenylazo)-benzothiadiazole-1,2,3 | do | Slightly blueish green. |
| 6-methoxy-4-(2'-hydroxy-5'-benzyloxyphenylazo)-benzothiadiazole-1,2,3 | do | Do. |
| 6-methoxy-4-(1'-hydroxy-4'-methyl-2'-naphthylazo)-benzothiadiazole-1,2,3 | Green blue | Green blue. |
| 6-methoxy-4-(1'-(o-chlorophenyl)-3'-methyl-5'-pyrazolon-4'-ylazo)-benzothiadiazole-1,2,3 | Golden color | Golden color. |
| 6-methoxy-4-(1'-(o-methylphenyl)-3'-methyl-5'-pyrazolon-4'-ylazo)-benzothiadiazole-1,2,3 | Yellow orange | Yellow orange. |
| 6-methoxy-4-(2'-hydroxy-3'-carboxyethylnaphthyl-1'-azo)-benzothiadiazole-1,2,3 | Red purple | Red purple. |
| 6-methoxy-4-(3'-hydoxy-5'-methylthionaphthen-2'-ylazo)-benzothiadiazole-1,2,3 | Purple | Purple. |
| 6-methoxy-4-(α'-acetoacetic-m-toluidid-(α')-ylazo)-benzothiadiazole-1,2,3 | Yellow | Yellow. |
| 6-methoxy-4-(α-acetylaceton-(α)-ylazo)-benzothiadiazole-1,2,3 | do | Yellow. |
| 6-methoxy-4-(1',3'-indandion-2'-ylazo)-benzothiadiazole-1,2,3 | Slightly blueish red | Do. |
| 6-methoxy-4-(1',3'-naphthindandion-2'-ylazo)-benzothiadiazole-1,2,3 | Red | Do. |
| 6-methoxy-4-(1'-1'-dimethyl-cyclohexene-(3')-ol-(3')-on-(5')-ylazo-(4')-benzothiadiazole-1,2,3 | Orange | |
| 6-methyl-4-(2'-hydroxy-1'-naphthylazo)-benzothiadiazole-1,2,3 | Purple | Purple. |
| 6-methyl-4-(2'-hydroxy-4'-diethylaminophenylazo)-benzothiadiazole-1,2,3 | do | Do. |
| 6-methyl-4-(2'-hydroxy-5'-methylphenylazo)-benzothiadiazole-1,2,3 | Blue | Blue. |
| 6-methyl-4-(2'-hydroxy-5'-methoxyphenylazo)-benzothiadiazole-1,2,3 | Green | Green. |
| 6-methyl-4-(3'-methyl-5'-pyrazolon-4'-ylazo)-benzothiadiazole-1,2,3 | Orange yellow | Orange yellow. |
| 6-methyl-4-(α-benzoyl-aceton-(α)-ylazo)-benzothiadiazole-1,2,3 | Yellow | Yellow. |
| 6-methyl-4-(1'-hydroxy-4'-chloro-2'-naphthylazo)-benzothiadiazole-1,2,3 | Green blue | |
| 6-methyl-4-(2'-hydroxy-3'-methoxy-5'-arylphenylazo)-benzothiadiazole-1,2,3 | Green | Green. |
| 6-methyl-4-(2'-hydroxy-3',5'-dimethoxyphenylazo)-benzothiadiazole-1,2,3 | do | Do. |
| 6-chloro-4-(2'-hydroxy-1'-naphthylazo)-benzothiadiazole-1,2,3 | Slightly reddish violet | |
| 5-methyl-4-(2'-hydroxy-1'-naphthylazo)-benzothiadiazole-1,2,3 | Purple | Purple. |
| 5-methyl-4-(2'-hydroxy-5'-methyl-phenylazo)-benzothiadiazole-1,2,3 | Blue | Blue. |
| 5-methyl-4-(2'-hydroxy-5'-ethoxy-phenylazo)-benzothiadiazole-1,2,3 | Green blue | Green blue. |
| 5-methoxy-4-(2'-hydroxy-1'-naphthylazo)-benzothiadiazole-1,2,3 | Red blue | Purple. |
| 5-methoxy-4-(2'-hydroxy-4'-diethylaminophenylazo)-benzothiadiazole-1,2,3 | Purple | Do. |
| 5-methoxy-4-(2'-hydroxy-4'-phenylaminophenylazo)-benzothiadiazole-1,2,3 | do | Do. |
| 5-methoxy-4-(2'-hydroxy-5'-methylphenylazo)-benzothiadiazole-1,2,3 | Blue green | Blue green. |
| 5-methoxy-4-(1'-hydroxy-4'-methoxy-2'-naphthylazo)-benzothiadiazole-1,2,3 | Green | Green. |
| 7-methoxy-4-(2'hydroxy-1'-naphthylazo)-benzothiadiazole-1,2,3 | Purple | Purple. |
| 5-methoxy-6-chloro-4-(2'-hydroxy-1'-napthylazo)-benzothiadiazole-1,2,3 | do | Do. |
| 5-methoxy-6-chloro-4-(2'-hydroxy-5'-methylphenylazo)-benzothiadiazole-1,2,3 | Greenish blue | Greenish blue. |
| 5-methoxy-6-chloro-4-(2'-hydroxy-3',5'-dimethylphenylazo)-benzothiadiazole-1,2,3 | Blue green | Blue green. |
| 5-methoxy-6-chloro-4-(2'-hydroxy-5'-methoxyphenylazo)-benzothiadiazole-1,2,3 | do | Do. |
| 5,7-dimethyl-4-(2'-hydroxy-1'-naphthylazo)-benzothiadiazole-1,2,3 | Purple | |
| 4-(2'-hydroxy-1'-naphthylazo)-benzothiadiazole-1,2,3 | do | Purple. |

EXAMPLE 12

4 grams of 4-amino-5-methoxy-2,1,3-benzothiazole were dissolved into a solution of 34.3 g. of 35% hydrochloric acid and 137 g. of water and the solution so prepared was cooled to 0 to 5° C. 1.68 grams of sodium nitrite were added thereto quickly in the form of solid, and the solution was stirred for 40 minutes at this temperature. On addition of 0.5 g. of decolorizing carbon, the solution was filtered. The so prepared red brown transparent diazotized solution was dropped at 15° C. into a coupling component solution prepared by dissolving 3.83 g. of m-diethylamino-phenol into 38 g. of glacial acetic acid and stirred at this temperature for 15 minutes. Thereafter, crystalline sodium acetate was added to adjust the pH to a range between 4 and 5. After further stirring at this temperature for 2 hours, the precipitated brown purple crystals were filtered and again suspended in 200 cc. of water, followed by neutralization with 10% aqueous ammonia to a pH of 7.5 to 8.

They were filtered, washed with water and dried at room temperature and a reduced pressure. There were obtained 7.2 g. of brown purple crystals having a melting point of 140 to 143° C. Purple crystals having a melting point of 145 to 146° C. were obtained further by re-crystalization from ethanol. The crystals were 4-(1'-hydroxy-5' - N,N - diethylamino-phenyl-2'-azo)-5-methoxy-2,1,3-benzothiazole. N analysis values: calculated 19.60%, found 19.56%.

30 grams of the thus obtained dyestuff were well kneaded with 15 g. of a condensation product formed from 2 moles of naphthalene sulphonic acid and 1 mole of formaldehyde, 5 g. of sodium N-dodecyl-2-methyl-benzoimidazole-5-sulphonate, 20 g. of sodium p-toluene sulpuhonate by means of three rolls. The obtained paste was dried at 60° C. and pulverised on a super high speed pulverizer to form a dyestuff composition in the form of fine particles.

0.5 grams of the dyestuff composition so obtained (30% pure content) was added to 300 cc. of water at 40° C. to form a homogeneous dispersion. 10 g. of a filament which has been prepared by melt spinning a chip mixture comprising 95 parts of powdery isotactic polypropylene having an inherent viscosity of 1.53 (measured in tetralin of 135° C.) and 5 parts of zinc stearate at 240° C. and drawing it to 5 times its original length in a customary manner were immersed in this suspension and heated to 98° C. in 20 minutes. After one hour's treatment, the filament was treated with soap. There was obtained a pure black dyeing having an excellent fastness to sunlight (Grade 5-6), drycleaning (Grade 5), rubbing (Grade 5), sublimation (Grade 5) and washing (Grade 5). It had a lightness of 4.0%, a purity of 4.3% and a dominant wavelength of 458.7 mμ.

tized in the same manner as in Example 12 and coupled with alkylphenol and alkoxynaphthol. The names of dyestuffs obtained, their melting points, the results of coloring and fastness properties are tabulated below.

TABLE V

| | | Result of Dyeing— Shade of polypropylene fiber containing 5% of— | | Color value | | | Fastness to— | | | | |
|---|---|---|---|---|---|---|---|---|---|---|---|
| Dyestuff | Melting point (° C.) | Nickel stearate | Zinc stearate | Lightness, percent | Purity, percent | Dominant wavelength (mμ) | Light | Washing | Rubbing | Sublimation | Drycleaning |
| 4-(1'-hydroxy-4'-methoxynaphthyl-2'-azo)-5-methoxy-benzothiadiazole. | 188–192 | Grey | Grey | 3.9 | 3.9 | 445.0 | 5–6 | 5 | 5 | 5 | 5 |
| 4-(1'-hydroxy-5'-N,N-dimethylaminophenyl-2'-azo)-5-methoxy-benzothiazole. | 205.5–207 | Black | Black | 4.2 | 5.3 | 452.1 | 5–6 | 5 | 5 | 5 | 5 |
| 4-(1'-hydroxy-5'-N-phenylaminophenyl-2'-azo)-5-methoxybenzothiazole. | 116–120 | Grey | Grey | 9.4 | 5.3 | 563.0 | 5 | 5 | 4 | 4 | 5 |

EXAMPLE 13

4.6 grams of 4-amino-5-methoxy-2,1,3-benzothiadiazole were dissolved in a solution of 39.4 g. of 35% hydrochloric acid in 158 g. of water and the solution was cooled to 0 to 5° C. After quickly adding 1.93 g. of sodium nitrite in a solid form, the solution was stirred for 40 minutes at this temperature. The so prepared red brown transparent diazotized solution was dropped at 10 to 15° C. into a coupling component solution prepared by dissolving 3.85 g. of β-naphthol into a solution of 55.5 g. of 30% caustic soda in 183 g. of water. After stirring for 30 minutes at this temperature, the precipitated coloring matter was filtered and was again suspended in 200 cc. of water. The suspension was then acidified with a dilute hydrochloric acid to Congo red and was adjusted with 10% aqueous ammonia to a pH of 7.5 to 8. It was again filtered, washed with water and dried at 60° C. Thus, 6.9 g. of red purple crystals having a melting point of 142 to 145° C. were obtained. Further, red purple crystals having a melting point of 146 to 148° C. were obtained by re-crystallization from 70% of aqueous dioxane. The crystals were 4-(2'-hydroxynaphthyl-1'-azo)-5-methoxy-2,1,3-benzothiadiazole. N analysis values: calculated 16.66%, found 16.63%.

This dyestuff colors a polypropylene fiber containing 5% of zinc stearate in slightly blueish grey. The dyeing had an excellent fastness to sunlight (Grade 6), washing (Grade 5), rubbing (Grade 5), sublimation (Grade 4) and drycleaning (Grade 5) and also a lightness of 4.4%, a purity of 4.8% and a dominant wavelength of 449.0 mμ.

EXAMPLE 14

4-amino-5-methoxy-2,1,3-benzothiadiazole was diazo-

EXAMPLE 15

4.4 grams of 4-amino-5-methyl-2,1,3-benzothiadiazole were diazotized in the same manner as in Example 12 and the obtained diazotized solution was dropped at 10 to 15° C. into a coupling component solution prepared by dissolving 4.6 g. of 1-phenyl-3-methyl-5-pyrazolone into a solution of 55.5 g. of 30% caustic soda and 183 g. of water. After stirring for 30 minutes at this temperature, the precipitated coloring matter was filtered. The treatment was carried out in the same manner as in Example 13 to form 7.5 g. of black brown crystals having a melting point of 115 to 125° C. Further, dark brown crystals having a melting point of 164 to 165° C. were obtained by re-crystallization from 70% aqueous dioxane. The crystals were 4-(1'-phenyl-3'-methyl-5'-pyrazolon-4'-ylazo)-5-methyl-2,1,3-benzothiadiazole. N analysis values: calculated 22.9%, found 22.91%.

This dyestuff colors a polypropylene fiber containing 5% zinc stearate in yellowish red. The dyeing had an excellent fastness to sunlight (Grade 5–6), washing (Grade 5), rubbing (Grade 5), sublimation (Grade 5) and drycleaning (Grade 5) and also a lightness of 17.0%, a purity of 64.0% and a dominant wavelength of 600.5 mμ.

In the same manner as above, the following two dyestuffs were prepared from 4-amino-2,1,3-benzothiadiazole and two pyrazolone derivatives. The melting points, the results of analysis and the results of dyeing of a polypropylene fiber containing 5% of nickel stearate with the use of the dyestuffs are shown in Table VI.

TABLE VI

| | | N analysis value (percent) | | | Results of Dyeing | | | | |
|---|---|---|---|---|---|---|---|---|---|
| | | | | | | Fastness to— | | | |
| Dyestuff | Melting point (° C.) | Found | Calculated | Color Shade | Sunlight | Washing | Rubbing | Sublimation | Drycleaning |
| 4-(1',3'-dimethyl-5'-pyrazolon-4'-ylazo)-2,1,3-benzothiadiazole. | 213–214 | 30.58 | 30.64 | Yellowish red | 5–6 | 5 | 5 | 5 | 5 |
| 4-(1'-ethyl-3'-methyl-5'-pyrazolon-4'-ylazo)-2,1,3-benzothiadiazole. | 169–171 | 29.09 | 29.15 | do | 5–6 | 5 | 5 | 5 | 5 |

EXAMPLE 16

4-amino-5-methyl-2,1,3-benzothiadiazole was diazotized in the same manner as Example 15 and coupled with the below indicated coupling components. The melting points of the obtained dyestuffs, the results of dyeing and fastness properties are tabulated below.

TABLE VII

| | | Result of Dyeing— Shade of polypropylene fiber containing 5% of— | | Color value | | | Fastness to— | | | | |
|---|---|---|---|---|---|---|---|---|---|---|---|
| Coupling component | Melting point (° C.) | Nickel stearate | Zinc stearate | Lightness, percent | Purity, percent | Dominant wavelength (mμ) | Light | Washing | Rubbing | Sublimation | Drycleaning |
| 2-naphthol | 193.5–195.0 | Slightly greenish grey | | 7.6 | 25.0 | 485.7 | 5 | 5 | 5 | 5 | 5 |
| N,N-dimethylaminophenol | 128–130 | | Black | 3.2 | 7.0 | 550.5 | 5–6 | 5 | 4 | 5 | 5 |

EXAMPLE 17

4.0 grams 4-amino-2,1,3-benzothiazole were dissolved into a solution of 33.9 g. of 35% hydrochloric acid in 135 g. of water, and cooled to 0 to 5° C. On addition of 1.60 g. of sodium nitrite, the solution was stirred for 40 minutes. After addition of 0.5 g. of a decolorizing carbon, the solution was filtered to obtain a diazotized solution.

This diazotized solution dropped into a coupling component solution prepared by dissolving 4.1 g. of m-dimethyl-amino-phenol into 35 g. of glacial acetic acid in the same member as in Example 12. 7.0 g. of 4-(1'-hydroxy-5-N,N - dimethylamino - phenyl - 2' - azo) - 2,1,3 - benzothiazole were recrystallized with ethanol to form a dyestuff having a melting point of 204 to 206° C. N analysis values: calculated 23.41%, found 23.27%.

This dyestuff colors a polypropylene fiber containing 5% of zinc stearate in dark black. The dyeing had an excellent fashion to sunlight (Grade 5–6), washing (Grade 5), rubbing (Grade 5), sublimation (Grade 5) and dry-cleaning (Grade 5) and also a lightness of 5.4%, a purity of 4.5% and a dominant wavelength of 561.7 mμ.

Similarly, with the use of 4-amino-2,1,3-benzothiadiazole, the following dyestuffs are obtained. The melting points, the results of dyeing, color values and fastness properties are tabulated in Table VIII.

EXAMPLE 18

Monoazo dyestuffs indicated in Table IX were prepared by coupling various 4-amino-2,1,3-benzothiadiazole derivatives with various coupling components. A polypropylene fiber containing 5% of a metal compound is colored by each of these dyestuffs. The obtained shades are shown in Table IX.

TABLE IX

| Dyestuff | Shade of polypropylene fiber containing— | |
|---|---|---|
| | Nickel stearate | Zinc stearate |
| 4-(2'-hydroxy-5'-methylphenylazo)-5-methoxy-benzothiadiazole-2,1,3 | Dark green | Dark green. |
| 4-(2'-hydroxy-5'-tert-butylphenlazo)-5-methoxy-benzothiadiazole-2,1,3 | do | Do. |
| 4-(2'-hydroxy-4'-dimethylaminophenylazo)-5-methoxy-benzothiadiazole-2,1,3 | Black | Black. |
| 4-(2'-hydroxy-4'-phenylaminophenylazo)-5-methoxy-benzothiadiazole-2,1,3 | Slightly blueish black | Slightly blueish black. |
| 4-(2'-hydroxy-5'-methoxyphenylazo)-5-methoxy-benzothiadiazole-2,1,3 | Green | Green. |
| 4-(2'-hydroxy-4'-butylaminophenylazo)-5-methoxy-benzothiadiazole-2,1,3 | Slightly blueish black | Slightly blueish black. |
| 4-(2'-hydroxy-4'-N-ethyl-N-benzylaminophenylazo)-5-methoxy-benxothiadiazole-2,1,3 | Black | Black. |
| 4-(1'-hydroxy-4'-methoxy-2'-naphthylazo)-5-methoxy-benzothiadiazole-2,1,3 | Slightly blueish grey | Slightly blueish grey. |
| 4-(1'-hydroxy-4'-methyl-2'-naphthylazo)-5-methoxy-benzothiadiazole-2,1,3 | Blueish grey | Blueish grey. |
| 4-(5'-hydroxy-4'-acenaphthylazo)-5-methoxy-benzothiadiazole-2,1,3 | do | Do. |
| 4-(3'-methyl-5'-pyrazolon-4-ylazo)-5-methoxy-benzothiadiazole-2,1,3 | Red | Red. |
| 4-(3'-hydroxy-5'-methyl-thionaphthen-2'-ylazo)-5-methoxy-benzothiadiazole-2,1,3 | Slightly blueish black | Slightly blueish black. |
| 4-(2',4'-dihydroxyphenylazo)-5-methoxy-benzothiadiazole-2,1,3 | Dark brown | Brown. |
| 4-(α-acetylaceton-α-ylazo)-5-methoxy-benzothiadiazole-2,1,3 | Orange yellow | Orange yellow. |
| 4-(1',3'-indan-di-on-2'-ylazo)-5-methoxy-benzothiadiazole-2,1,3 | Red purple | Red purple. |
| 4-(α-acetylacetic-ethylamid-(α)-ylazo)-5-methoxy-benzothiadiazole-2,1,3 | Orange | Orange. |
| 4-(2'-hydroxy-1'-naphthylazo)-5-methyl-benzothiadiazole-2,1,3 | Dark blue | Dark blue. |
| 4-(2'-hydroxy-4'-diethylaminophenylazo)-5-methoxy-benzothiadiazole-2,1,3 | Black | Black. |
| 4-(2'-hydroxy-4'-ethylaminophenylazo)-5-methyl-benzothiadiazole-2,1,3 | Slightly blueish black | Blueish black. |
| 4-(2'-hydroxy-4'-butylaminophenylazo)-5-methyl-benzothiadiazole-2,1,3 | do | Do. |
| 4-(2'-hydroxy-4'-dimethylaminophenylazo)-5-methyl-benzothiadiazole-2,1,3 | Black | Black. |
| 4-(2'-hydroxy-4'-dibutylaminophenylazo)-5-methyl-benzothiadiazole-2,1,3 | Slightly blueish black | Slightly blueish black. |
| 4-(2'-hydroxy-4'-morpholinophenylazo)-5-methyl-benzothiadiazole-2,1,3 | Blackish blue | Blackish blue. |
| 4-(2'-hydroxy-5'-methoxyphenylazo)-5-methyl-benzothiadiazole-2,1,3 | Green | Green. |
| 4-(1'-hydroxy-4'-methoxy-2'-naphthylazo)-5-methyl-benzothiadiazole-2,1,3 | do | Do. |
| 4-(2'-hydroxy-3'-carboxyethyl-1'-naphthylazo)-5-methyl-benzothiadiazole-2,1,3 | Blueish black | Blueish black. |
| 4-(α-acetylaceton-α-ylazo)-5-methyl-benzothiadiazole-2,1,3 | Yellow orange | Yellow orange. |
| 4-(α-benzoylaceton-α-ylazo)-5-methyl-benzothiadiazole-2,1,3 | do | Do. |
| 4-(1'-(o-chlorophenyl)-3'-methyl-5'-pyrazol-4'-ylazo)-5-methyl-benzothiadiazole-2,1,3 | Red orange | Red orange. |
| 4-(α-acetylacetic-ethyl-(α)-ylazo)-5-methyl-benzothiadiazole-2,1,3 | Brown | Brown. |
| 4-(1',1'-dimethyl-cyclohexene-(3')-ol-(3')-on-(5')-ylazo-(4'))-5-methyl-benzothiadiazole-2,1,3 | Orange | Orange. |
| 4-(2'-hydroxy-1'-naphthylazo)-7-methyl-benzothiadiazole-2,1,3 | Dark blue | Blue. |
| 4-(2'-hydroxy-4'-diethylaminophenylazo)-7-methyl-benzothiadiazole-2,1,3 | Slightly blueish black | Blueish black. |
| 4-(2'-hydroxy-1'-naphthylazo)-6-methyl-benzothiadiazole-2,1,3 | Blueish black | Do. |
| 4-(2'-hydroxy-4'-dimethylaminophenylazo)-6-methyl-benzothiadiazole-2,1,3 | do | Do. |
| 4-(2'-hydroxy-1'-naphthylazo)-6-methoxy-benzothiadiazole-2,1,3 | Blue black | Blue black. |
| 4-(2'-hydroxy-4'-diethylaminophenylazo)-6-methoxy-benzothiadiazole-2,1,3 | Black | Do. |
| 4-(2'-hydroxy-1'-naphthylazo)-7-methoxy-benzothiadiazole-2,1,3 | Blue black | Do. |
| 4-(2'-hydroxy-4'-dibutylaminophenylazo)-7-methoxy-benzothiadiazole-2,1,3 | Black | Black. |
| 4-(2'-hydroxy-4'-diethylaminophenylazo)-5-chloro-benzothiadiazole-2,1,3 | Slightly blueish black | Slightly blueish black. |
| 4-(2'-hydroxy-4'-diethylaminophenylazo)-5,7-dimethyl-benzothiadiazole-2,1,3 | do | Do. |
| 4-(2'-hydroxy-4'-diethylaminophenylazo)-5-chloro-7-methyl-benzothiadiazole-2,1,3 | do | Do. |
| 4-(2'-hydroxy-4'-diethylaminophenylazo)-5-methoxy-7-methyl-benzothiadiazole-2,1,3 | Black | Black. |
| 4-(2'-hydroxy-4'-diethylaminophenylazo)-5-ethoxy-7-methyl-benzothiadiazole-2,1,3 | do | Do. |
| 4-(2'-hydroxy-4'-diethylaminophenylazo)-5-methyl-7-methoxy-benzothiadiazole-2,1,3 | do | Do. |
| 4-(2'-hydroxy-4'-diethylaminophenylazo)-5,7-dimethoxy-benzothiadiazole-2,1,3 | do | Do. |

We claim:

1. A method of dyeing shaped articles of olefin polymers containing a transition metal compound, which comprises dyeing a shaped article of olefin polymer obtained by melt-shaping a polyolefin resin in which is incorporated at least 0.01% by weight, based on the resin, of a transition metal compound, calculated as the metal; with a water-insoluble dyestuff having the formula

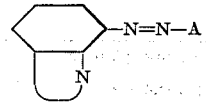

wherein

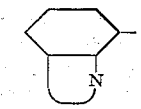

TABLE VIII

| Dyestuff | Melting point (° C.) | Results of Dyeing—Shade of polypropylene fiber containing 5% of— | | Color value | | | Fastness to— | | | | |
|---|---|---|---|---|---|---|---|---|---|---|---|
| | | Nickel stearate | Zinc stearate | Lightness, percent | Purity, percent | Dominant wavelength (mμ) | Light | Washing | Rubbing | Sublimation | Dry-cleaning |
| 4-(1'-hydroxy-4'-tert-butyl-phenyl-2'-azo-2,1,3-benzo-thiadiazole. | 135.5–137 | Dark green. | | 5.5 | 16.0 | 499.8 | 5 | 5 | 5 | 5 | 5 |
| 4-(1'-hydroxy-4'-methoxy-phenyl-2'-azo)-2,1,3-benzo-thiadiazole. | 132–134 | | Deep green. | 5.4 | 14.9 | 498.6 | 5–6 | 5 | 5 | 4 | 5 |
| 4-(1'-hydroxy-5'N,N-diethyl-amino-phenyl-2'-azo)-2,1,3-benzothiadiazole). | 176.5–177.5 | Black | | 3.8 | 6.1 | 557.5 | 5–6 | 5 | 4 | 5 | 5 | is a member selected from the group consisting of the residues of benzothiazole, 1,2,3-benzothiadiazole and 2,1,3-benzothiadiazole, said residues being substitutable with halogen, alkyl, alkoxy, acyl, alkylamino, dialkylamino, acylamino and mercapto; and A is a member selected from the class consisting of aromatic rings, heterocyclic, cycloaliphatic and aliphatic groups, a hydroxyl group being attached thereto at one of the ortho positions with respect to the position of attachment of said A to the —N=N— group and the other positions of said A being substitutable with hydrogen, halogen, hydroxy alkoxy, alkylamino, dialkylamino, arylamino, phenyl, substituted phenyl, carboxylic esters, carboxylic amides and heterocyclic group.

2. The method according to claim 1 wherein said transition metal compound is an organic acid salt of a transition metal.

3. The method according to claim 1 wherein said transition metal compound is a carboxylic acid salt of a transition metal.

4. The method according to claim 1 wherein the transition metal is nickel.

5. The method according to claim 1 wherein the transition metal is zinc.

6. A method of dyeing shaped articles of olefin polymers containing a transition metal compound, which comprises dyeing a shaped article of olefin polymer obtained by melt-shaping a polyolefin resin in which is incorporated at least 0.01% by weight, based on the resin, of a transition metal compound, calculated as the metal with a water-insoluble dyestuff having the formula

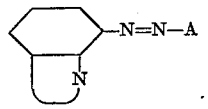

wherein

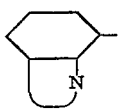

is a member selected from the group consisting of substituted and unsubstituted benzothiazolyl, substituted and unsubstituted 1,2,3-benzothiadiazolyl, and substituted and unsubstituted 2,1,3-benzothiadiazolyl, the substituents being selected from the group consisting of lower alkyl, lower alkoxy, di(lower)alkylamino, Cl, Br, lower alkanoylamino and mercapto, and A being a member selected from the group consisting of phenyl, naphthyl, acenaphthyl, pyrazolonyl, thionaphthyl, cyclohexanyl, cyclohexenyl, 1,3-indandionyl, naphthindandionyl, acetoacetyl and aceto(lower)alkyl, a hydroxyl group being attached to A at one of the positions ortho with respect to the position of attachment of said A to the —N=N— group and the other positions of said A being severally substitutable with a member selected from the group consisting of H, Cl, OH, lower alkyl, allyl, lower alkoxy, benzyloxy, lower alkylamino, benzylamino, di(lower)alkylamino, phenylamino, phenyl, chlorophenyl, bromophenyl, lower alkylphenyl, lower alkoxyphenyl, carboxy (lower)alkyl, CONH₂ and morpholino.

7. The method according to claim 6 wherein said transition metal compound is an organic acid salt of a transition metal.

8. The method according to claim 6 wherein said transition metal compound is a carboxylic acid salt of a transition metal.

9. The method according to claim 6 wherein the transition metal is nickel.

10. The method according to claim 6 wherein the transition metal is zinc.

11. The method according to claim 6 wherein the dyestuff is 4-(1'-hydroxy-5'-N,N-diethylaminophenyl-2'-azo)-2,1,3-benzothiadiazole.

12. The method according to claim 6 wherein the dyestuff is 4-(1'-hydroxy-4'-methoxynaphthyl-2'-azo)-6-methoxy-2-methyl-benzothiazole.

13. The method according to claim 6 wherein the dyestuff is 4-(1'-hydroxy-4'-tert-butylphenyl-2'-azo)-6-methoxy-1,2,3-benzothiadiazole.

14. The method according to claim 6 wherein the dyestuff is 4-(1'-hydroxy-4'-methoxyphenyl-2'-azo)-6-methoxy-1,2,3-benzothiadiazole.

15. The method according to claim 6 wherein the dyestuff is 4-(1'-hydroxy-5'-N,N-diethylaminophenyl-2'-azo)-5-methoxy-2,1,3-benzothiadiazole.

16. A dyed shaped article of olefin polymer containing at least 0.01% by weight, based on the polymer, of a transition metal compound, calculated as the metal, and an effective amount of a water-insoluble dyestuff having the formula

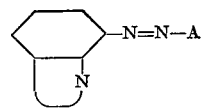

wherein

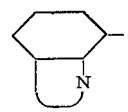

is a member selected from the group consisting of substituted and unsubstituted benzothiazolyl, substituted and unsubstituted 1,2,3-benzothiadiazolyl, and substituted and unsubstituted 2,1,3-benzothiadiazolyl, the substituents being selected from the group consisting of lower alkyl, lower alkoxy, di(lower)alkylamino, Cl, Br, lower alkanoylamino and mercapto, and A being a member selected from the group consisting of phenyl, naphthyl, acenaphthyl, pyrazolonyl, thionaphthyl, cyclohexanyl, cyclohexenyl, 1,3-indandionyl, naphthindandionyl, acetoacetyl and aceto(lower)alkyl, a hydroxyl group being attached to A at one of the positions ortho with respect to the position of attachment of said A to the —N—N— group and the other positions of said A being severally substitutable with a member selected from the group consisting of H, Cl, OH, lower alkyl, allyl, lower alkoxy, benzyloxy, lower alkylamino, benzylamino, di(lower) alkylamino, phenylamino, phenyl, chlorophenyl, bromophenyl, lower alkyl-phenyl, lower alkoxyphenyl, carboxy (lower)alky, CONH₂ and morphoino.

17. A dyed shaped article according to claim 16, wherein said transition metal compound is an organic acid salt of a transition metal.

18. A dyed shaped article according to claim 16, wherein said transition metal compound is a carboxylic acid salt of a transition metal.

19. A dyed shaped article according to claim 16, wherein the transition metal is nickel.

20. A dyed shaped article according to claim 16, wherein the transition metal is zinc.

References Cited

FOREIGN PATENTS 642,346   5/1964   Belgium.
648,524   11/1964  Belgium.

GEORGE F. LESMES, Primary Examiner

D. LEVY, Assistant Examiner

U.S. Cl. X.R.

8—42